No. 712,573. Patented Nov. 4, 1902.
T. R. McKNIGHT.
DUMP CAR.
(Application filed Apr. 11, 1902.)
(No Model.) 2 Sheets—Sheet 1.
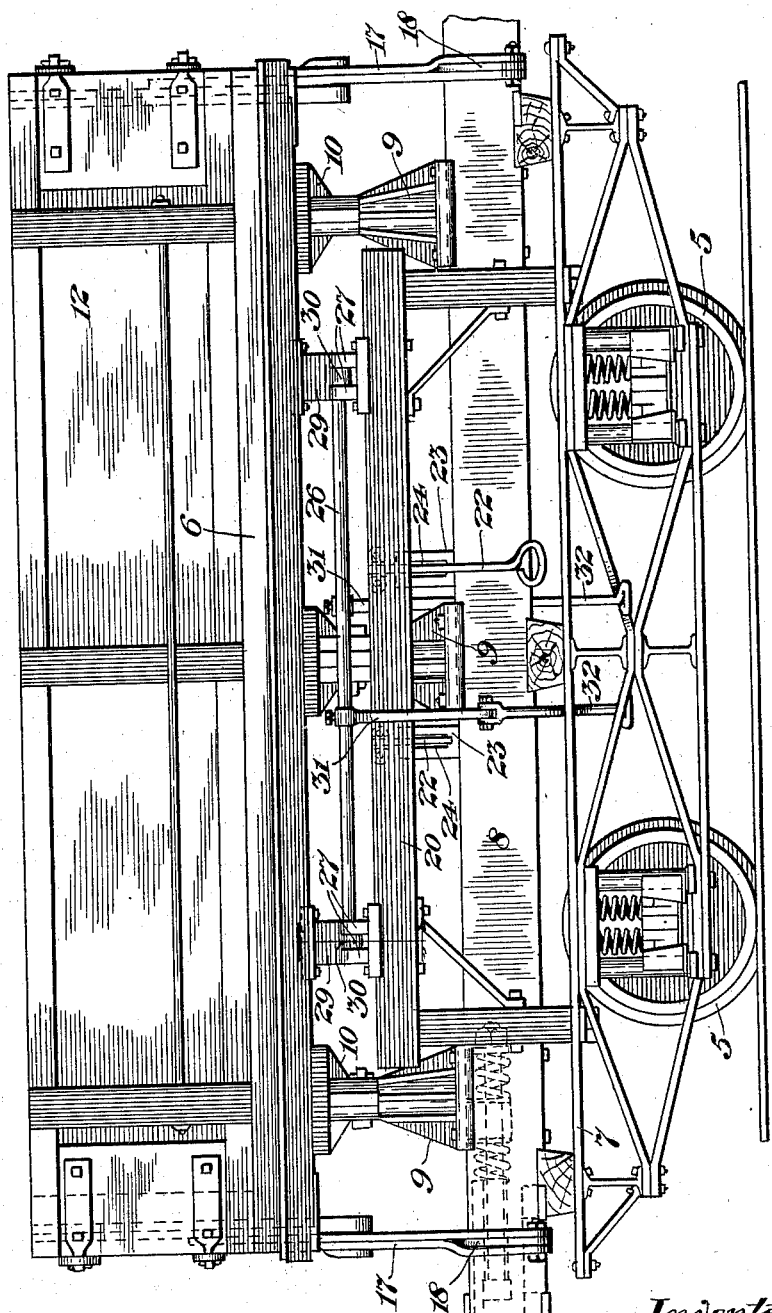

No. 712,573. Patented Nov. 4, 1902.
T. R. McKNIGHT.
DUMP CAR.
(Application filed Apr. 11, 1902.)
(No Model.) 2 Sheets—Sheet 2.
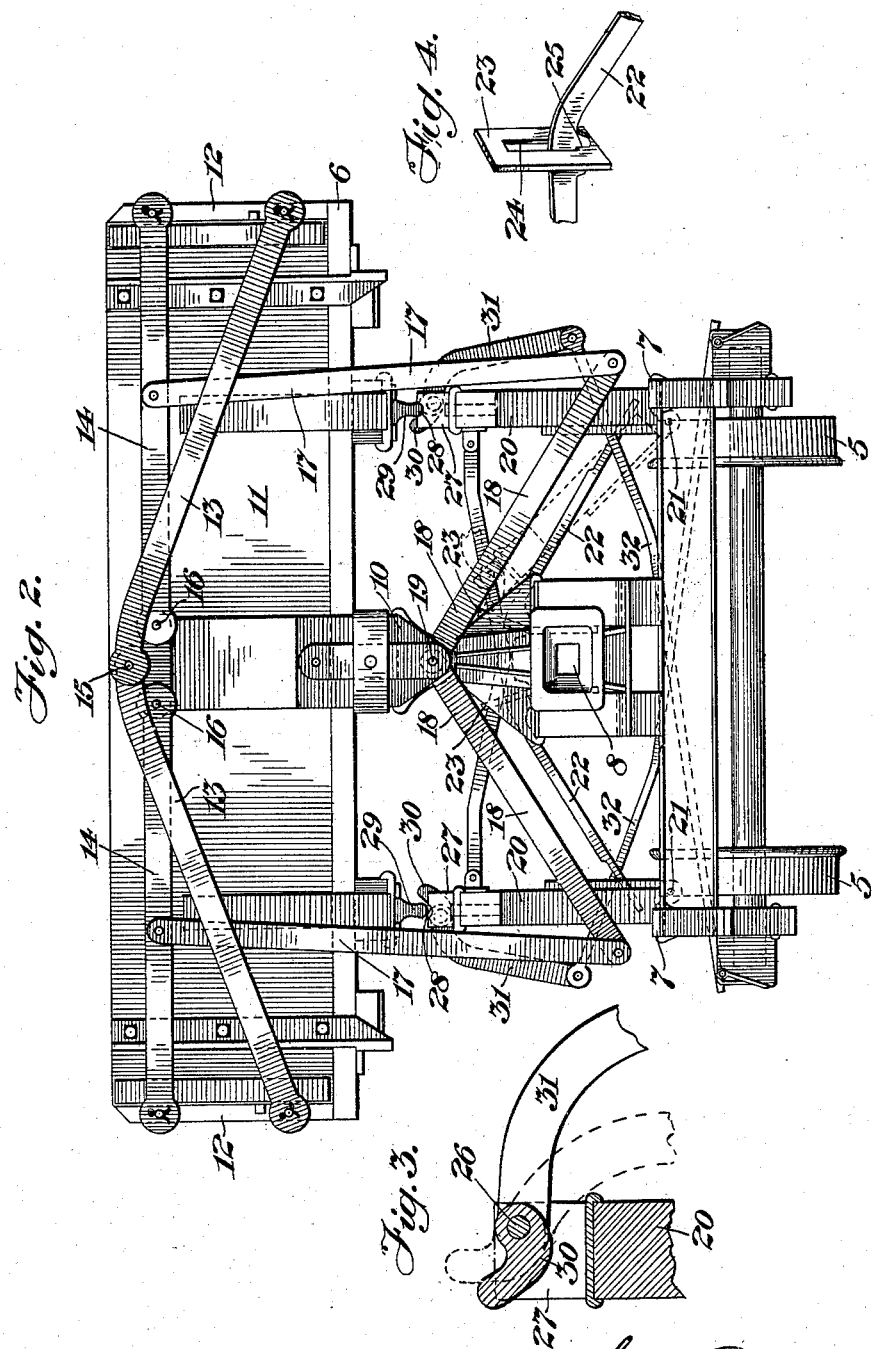
Witnesses: Inventor:
Thomas R. McKnight

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

DUMP-CAR.

SPECIFICATION forming part of Letters Patent No. 712,573, dated November 4, 1902.

Application filed April 11, 1902. Serial No. 102,400. (No model.)

*To all whom it may concern:*

Be it known that I, THOMAS R. McKNIGHT, a citizen of the United States, residing at Aurora, in the county of Kane and State of Illinois, have invented certain new and useful Improvements in Dump-Cars, of which the following is a specification, reference being had to the accompanying drawings.

My invention relates to dump-cars having side boards adapted to be raised, so that the contents of the car may be discharged when the car is tilted or turned toward one side. In cars of this character the car-body is ordinarily supported centrally by a plurality of pivots extending longitudinally of the car. It is of course necessary to provide means for normally supporting or holding the car-body in a substantially horizontal position, and in the construction shown there is pivoted at each side of the car a rigid support for this purpose, each of such supports being so attached to the car-truck as to be capable of being swung inward toward the center of the car to permit the car-body to be turned for dumping its load. It frequently happens, owing to the load being unequally distributed, that the car-body will be found to be sufficiently turned on its central pivots to bear with great weight on the support at that side of the car from which the load is to be dumped, thus rendering it a matter of considerable difficulty to move such support to permit the dumping to be effected.

It is the object of my invention to provide means for readily causing a disengagement of the support and the car-body under such circumstances, and I accomplish this by the mechanism illustrated in the accompanying drawings and hereinafter fully described.

That which I regard as new will be set forth in the claims.

In said drawings, Figure 1 is a side elevation of a dump-car embodying my improvements. Fig. 2 is an end view of such car. Fig. 3 is a detail of the means for disengaging the car-body from one of its supports, and Fig. 4 is a detail of the means employed for locking one of the supports in a vertical position.

Referring to the several figures of the drawings, 5 indicates the wheels of a truck supporting the car-body, the floor of which is indicated by 6. The truck shown is an ordinary steel truck, the side bars of which are indicated by 7.

8 indicates an ordinary draw-bar. Upon the draw-bar at suitable intervals is arranged a series of suitable supporting-blocks 9 of any approved form, to which the car-body is adapted to be pivotally secured through the medium of ears 10, projecting from the under side of the floor 6 of the car-body, whereby the car-body may be allowed to be turned to discharge its contents.

11 indicates the fixed ends of the car-body, and 12 the movable side boards thereof. The side boards are each connected to each end 11 by a pair of links 13 14, the links 13 being connected at their inner ends to pivots 15 near the upper edges of the ends 11 and midway the length thereof, their outer ends being connected to the side-boards 12 near the lower edges thereof, as shown. The outer ends of the links 14 are connected to the side boards near the upper edges thereof and their inner ends are each connected to a pivot 16, arranged at opposite sides of the pivot 15 and slightly below said pivot. It will be understood that each end of the car is provided with a similar pair of the links 13 14. The side boards 12 are raised automatically when the car-body is tilted by means of toggle-levers 17 18, the levers 17 being pivoted to the levers 18 and to the links 14, while the levers 18 are pivotally connected at their inner ends with the car-body by a pivot 19.

The construction and arrangement of devices for causing a raising and lowering of the movable side boards are the same as shown in Letters Patent No. 668,927, dated February 26, 1901, granted upon my application, and the mode of operation is the same as therein described. For that reason I do not deem it necessary to here describe the same more in detail.

20 indicates two frames, one located at each side of the car-truck and in the form of construction shown extending nearly the full length of such truck. Each frame 20 in the arrangement shown consists of a series of posts of equal height, to the tops of which is suitably secured a cross-bar. Each frame as a whole is pivotally secured to the truck, the pivots being indicated by 21 and the arrangement of the parts being such that the frame can be swung inward or toward the center of the car only. This is accomplished in the construction shown by having the lower ends of the series of posts of the frame rest upon the flat upper face of the side pieces 7 of the truck and locating the pivots at the inner sides of the side bars 7 of the truck-frame.

22 indicates two rods each pivotally connected at one end to one of the frames 20 and being of a length to allow its other end to project across the car-truck, where it can be easily reached. The point of pivotal connection of each rod to its frame is preferably about the center of the cross-bar of said frame, and the outer end of the rod is preferably formed with a handle portion, as clearly shown in Fig. 1.

23 indicates a pair of plates fixedly secured to the draw-bar and, as shown, inclined in opposite directions from such draw-bar. Each plate is provided with a slot 24, through which one of the rods 22 passes, the rod in each instance being adapted to engage the plate by means of a notch 25, (see Fig. 4,) formed in the lower edge of the rod. This notch is so located as to engage the plate when the supporting-frame 20 to which it is attached is in an upright position. The slot 24 in each plate is, as will be seen, of sufficient length to allow the rod passing therethrough to be readily disengaged from the plate. Each rod is also slightly bent, as shown, so as to offer no obstruction to the full downward movement of the car-body, such bend being at about the center of the rod to cause the outer or free end thereof to be depressed to about the upper surface of the sides 7 of the truck, against which sides the car-body comes in contact when in its lowest position. This construction and arrangement of pivoted supports and their operating-rods form no part of my present invention, but form the subject-matter of a joint application by myself and Hiram A. Clapp, filed April 7, 1902, Serial No. 101,793.

26 indicates a rock-shaft suitably journaled in ears 27, fixedly secured to the upper surface of the cross-piece of the pivoted support 20, the upper surfaces of these ears being provided, as clearly shown in Fig. 2, with rounded notches 28. As shown, a pair of these ears 27 is located near each end of each support 20, and each pair is preferably formed with a common base-plate, as indicated. The rock-shaft 26 is, as shown, journaled in these ears at one side of their center, being located, as shown, toward the outer edge thereof.

29 indicates depending bearings suitably attached to the under side of the floor 6 of the car-body, one of such bearings being located directly over each pair of ears 27 and each having its lower or contacting end rounded, as shown, to adapt it to fit the rounded notches 28 in the upper ends of the ears 27, thus causing the dependent bearings on one side to form a slight interlocking engagement with the support whenever the car-body is tilted to one side.

30 indicates a curved dog at each end of each rock-shaft 26 and formed with such rock-shaft or rigidly secured thereto, each dog in the construction and arrangement shown lying between a pair of the ears 27. The upper face of each dog is curved, so as not to interfere with the free seating of the bearings 24 in the rounded notches 28 in the upper faces of the ears 27, and the inner or free end of each dog 30 is curved upward, so as to lie opposite the inner face of the adjacent bearing 29 and contact such face when the rock-shaft is turned.

31 indicates two arms each rigidly secured at its upper end to one of the rock-shafts 26 near the center of such rock-shaft. Each of these arms 31 is somewhat curved at its upper end, being so constructed and attached that an inward pull on its outer or lower end toward the opposite side of the car will turn the rock-shaft to which it is attached.

32 indicates two rods each pivotally connected at one end to the lower end of one of the arms 31. Each rod 32 is bent or curved, so as to adapt it to pass beneath the draw-bar, and its free end (which is preferably provided with a suitable handle portion, as shown) extends to the opposite side of the car-truck in position to be easily grasped by an operator at that side of the car.

When it is desired to dump a load from the car, the rod 22, that is connected to the support 20 on that side at which the dumping is to be effected, is lifted up sufficiently to disengage it from its holding-plate 23, and if the car-body be so tilted or turned as to be out of engagement with that support 20 the said support can be easily turned inward toward the center of the car, so as to permit the car-body to be turned to dump its load. If, however, the weight of the load in the car is so distributed as to cause the car to be tilted so that, as shown at the right-hand side of Fig. 2, the bearings 29 rest heavily in the notched ears 27 on the support it will be found very difficult indeed to turn that support by pulling on its rod 22. In such case the operator will give a pull on the rod 32, that is connected to that support, which, through the movement of its attached arm 31, will rock its shaft 26, turning also the dogs 30, which, as will readily be understood, will act with great force against the bearings 29, the effect being to raise the car-body sufficiently at that side to permit a disengagement of the bearings 29 and the ears 27. The force so exerted tends also, owing to the shape of the dogs and the pivoting of the shaft at one side of the center of the ears, to force the support inward, or toward the center of the car.

By these means a very powerful construction is provided by which the car can be quickly dumped, notwithstanding the fact that the car may be so tilted as to bear with great weight upon the support at that side at which the load is to be dumped, and this, too, without any danger of injury to the operator, who, as will be understood, is always stationed upon the opposite side of the car from that at which the dumping is to occur.

In turning, the system of levers and links shown and herein briefly described act, as fully set forth in said Letters Patent No. 688,927, to automatically raise the movable side board to permit the load to pass freely from the car.

That which I claim as my invention, and desire to secure by Letters Patent, is—

1. The combination with a dump-car, of a movable support beneath the body of the car at the side where the contents of the car are to be discharged, and means for simultaneously raising the car-body from the support and moving said support out of supporting position, substantially as specified.

2. The combination with a dump-car, of a movable support beneath the body of the car at the side where the contents of the car are to be discharged, means movably connected with said support for raising the car-body away from the support, and means for moving said support out of supporting position, substantially as specified.

3. The combination with a dump-car, of a pivoted support beneath the body of the car at the side where the contents of the car are to be discharged, and means movably connected with said support for simultaneously raising the car-body away from the support and for moving said support on its pivot, substantially as specified.

4. The combination with a dump-car, of a pivoted support beneath the body of the car at the side of the car where the contents of the car are to be discharged, said support having a notch in its upper portion, a depending bearing secured to the under side of the car-body and adapted to enter said notch, and means for forcing said bearing out of said notch, substantially as specified.

5. The combination with a dump-car, of a pivoted support beneath the body of the car at the side of the car where the contents of the car are to be discharged, said support having a notch in its outer portion, a depending bearing secured to the under side of the car-body and adapted to enter said notch, and means for simultaneously forcing said bearing out of said notch and turning said support on its pivot, substantially as described.

6. The combination with a dump-car, of a pivoted support beneath the body of the car at the side of the car where the contents of the car are to be discharged, said support having a notch in its outer portion, an ear on said support, a dog pivoted to said ear and normally lying below said notch, a depending bearing secured to the under side of the car-body and adapted to enter said notch, and means for turning said pivoted dog to force said bearing out of said notch, substantially as specified.

7. The combination with a dump-car, of a pivoted support beneath the body of the car at the side of the car where the contents of the car are to be discharged, said support having a notch in its outer portion, an ear on said support, a dog normally lying below said notch and pivoted at one side of the center of said ear, a depending bearing secured to the under side of the car-body and adapted to enter said notch, and means for turning said dog to raise said depending bearing out of the notch and at the same time turn the support on its pivot, substantially as specified.

8. The combination with a dump-car, of a pivoted support beneath the body of the car at the side of the car where the contents of the car are to be discharged, said support having a notch in its outer portion, an ear on said support, a dog normally lying below said notch and pivoted at one side of the center of the ear and having a turned end, a depending bearing secured to the under side of the car-body and adapted to enter said notch, and means for turning said pivoted dog to force it against the end and side of said depending bearing, substantially as specified.

9. The combination with a dump-car adapted to dump at the side and having a depending bearing on the lower face of the car-body, of a support pivoted to the car-truck and adapted at its upper end to be interlocked with said depending bearing, means carried by said support for breaking the interlocking engagement between said bearing and support, and means for turning said support on its pivot, substantially as specified.

10. The combination with a dump-car adapted to dump at the side and having a depending bearing on the lower face of the car-body, of a support pivoted to the car-truck and adapted at its upper end to be engaged by said depending bearing, and means carried by said support for breaking the engagement between said depending bearing and pivoted support and at the same time turning said support on its pivot, substantially as specified.

11. The combination with a dump-car, of a movable support beneath the body of the car at the side where the contents of the car are to be discharged, means for simultaneously raising the car-body from the support and moving said support out of supporting position, and a device connected with said means and extending transversely of the car, whereby said means may be operated from the side of the car opposite to that at which the contents of the car are dumped, substantially as specified.

12. The combination with a dump-car, of a pivoted support beneath the body of the car at the side where the contents of the car are to be discharged, a rock-shaft journaled on said support, a dog carried by said rock-shaft and adapted upon the rocking of said shaft to remove the weight of the car-body from the said support, and means for turning said rock-shaft, substantially as specified.

13. The combination with a dump-car, of a pivoted support beneath the body of the car at the side where the contents of the car are to be discharged, a rock-shaft journaled on said support, a dog carried by said rock-shaft and adapted upon the rocking of said shaft to remove the weight of the car-body from the said support, an arm secured to said rock-shaft, and means connected with said arm and extending transversely of the car for rocking said shaft, substantially as specified.

14. The combination with a dump-car, of a pivoted support beneath the body of the car at the side where the contents of the car are to be discharged, ears carried by said support, a rock-shaft journaled in said ears at one side of the centers thereof, a curved dog carried by said rock-shaft, an arm adapted to operate said rock-shaft, and a bearing depending from the under surface of the car-body over said dog, said dog being adapted upon the turning of the rock-shaft to contact the end and one side of the said bearing, substantially as specified.

THOMAS R. McKNIGHT.

Witnesses:
  J. C. BEEDE,
  GEO. C. PECK.